United States Patent
Mo et al.

(10) Patent No.: US 11,915,079 B2
(45) Date of Patent: Feb. 27, 2024

(54) BIOMETRIC SENSOR MODULE FOR CARD INTEGRATION

(71) Applicant: Fingerprint Cards Anacatum IP AB, Gothenburg (SE)

(72) Inventors: Zhimin Mo, Mölndal (SE); Zhecheng Shao, Gothenburg (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 24 days.

(21) Appl. No.: 17/783,063

(22) PCT Filed: Dec. 2, 2020

(86) PCT No.: PCT/SE2020/051159
§ 371 (c)(1),
(2) Date: Jun. 7, 2022

(87) PCT Pub. No.: WO2021/118432
PCT Pub. Date: Jun. 17, 2021

(65) Prior Publication Data
US 2023/0021212 A1    Jan. 19, 2023

(30) Foreign Application Priority Data
Dec. 12, 2019   (SE) .................... 1951439-7

(51) Int. Cl.
*G06K 19/07*   (2006.01)
*G06V 40/13*   (2022.01)
*G06K 19/077*  (2006.01)

(52) U.S. Cl.
CPC ... *G06K 19/0718* (2013.01); *G06K 19/07728* (2013.01); *G06V 40/1306* (2022.01); *G06V 40/1329* (2022.01)

(58) Field of Classification Search
CPC ......... G06K 19/0718; G06K 19/07728; G06V 40/1306; G06V 40/1329
See application file for complete search history.

(56) References Cited

U.S. PATENT DOCUMENTS

| 5,615,476 A | 4/1997 | Bottge et al. |
| 6,166,914 A | 12/2000 | Sugiyama et al. |

(Continued)

FOREIGN PATENT DOCUMENTS

| CA | 2646239 A1 * | 10/2007 | ......... G06K 19/0718 |
| CN | 106129027 B | 3/2019 | |

(Continued)

OTHER PUBLICATIONS

WO2018026132A1 Fingerprint Sensor Package and Fingerprint Sensor Module Including Same, 5 Pages. (Year: 2023).*

(Continued)

*Primary Examiner* — Tuyen K Vo
(74) *Attorney, Agent, or Firm* — RMCK Law Group, PLC

(57) ABSTRACT

A biometric sensor module for detecting a biometric feature of a user comprises: a biometric sensor comprising an array of sensing elements for acquiring sensing signals indicative of a biometric feature of a user, the array of sensing elements arranged facing towards a front side of the biometric sensor. Further, the biometric sensor module comprises a bottom flexible film attached to a back side, opposite the front side, of the biometric sensor. The bottom flexible film can carry at least one electrically conductive line electrically connectable to the biometric sensor and electrically connectable to an external electrical circuit. The biometric sensor module further comprises a top film attached to the biometric sensor closer to the front side of the biometric sensor than the bottom flexible film. The flexible film includes a bent (Continued)

portion such that the flexible film is bent towards the top film.

19 Claims, 11 Drawing Sheets

(56) References Cited

U.S. PATENT DOCUMENTS

| | | | |
|---|---|---|---|
| 6,262,513 | B1 | 7/2001 | Furukawa et al. |
| 10,990,792 | B2 * | 4/2021 | Park ................... G06V 40/1306 |
| 2004/0177498 | A1 | 9/2004 | Moriya et al. |
| 2007/0086634 | A1 | 4/2007 | Setlak et al. |
| 2008/0223925 | A1 * | 9/2008 | Saito ................ G06Q 20/40145 235/380 |
| 2012/0242635 | A1 | 9/2012 | Erhart et al. |
| 2015/0187707 | A1 | 7/2015 | Lee et al. |
| 2015/0294135 | A1 | 10/2015 | Kim et al. |
| 2017/0213097 | A1 * | 7/2017 | Vogel ................... G06V 10/147 |
| 2017/0243046 | A1 | 8/2017 | Chang et al. |
| 2017/0286739 | A1 * | 10/2017 | Shibano ............. G06V 40/1306 |
| 2019/0087622 | A1 | 3/2019 | Benkley, III et al. |
| 2019/0213373 | A1 | 7/2019 | Kim et al. |
| 2020/0160024 | A1 * | 5/2020 | Jin ........................ G06K 19/02 |
| 2021/0049439 | A1 * | 2/2021 | Finn ................. G06K 19/07354 |

FOREIGN PATENT DOCUMENTS

| | | | | |
|---|---|---|---|---|
| EP | 1105838 | A1 | 6/2001 | |
| EP | 2045305 | A1 | 4/2009 | |
| EP | 3336759 | A1 | 6/2018 | |
| EP | 3933697 | A1 * | 1/2022 | ......... G06K 19/0718 |
| JP | H10125825 | A | 5/1998 | |
| JP | 2006344756 | A | 12/2006 | |
| SE | 1750770 | A1 | 12/2018 | |
| WO | 2016108628 | A1 | 7/2016 | |
| WO | 2018026132 | A1 | 2/2018 | |
| WO | WO-2018026132 | A1 * | 2/2018 | ......... G06K 9/00006 |
| WO | WO-2021030782 | A2 * | 2/2021 | ......... G06K 19/0718 |

OTHER PUBLICATIONS

Extended European Search Report dated Mar. 1, 2021 for EP Application No. 20194546.6, 9 pages.

PCT International Search Report and Written Opinion dated Feb. 15, 2021 for International Application No. PCT/SE2020/051159, 14 pages.

* cited by examiner

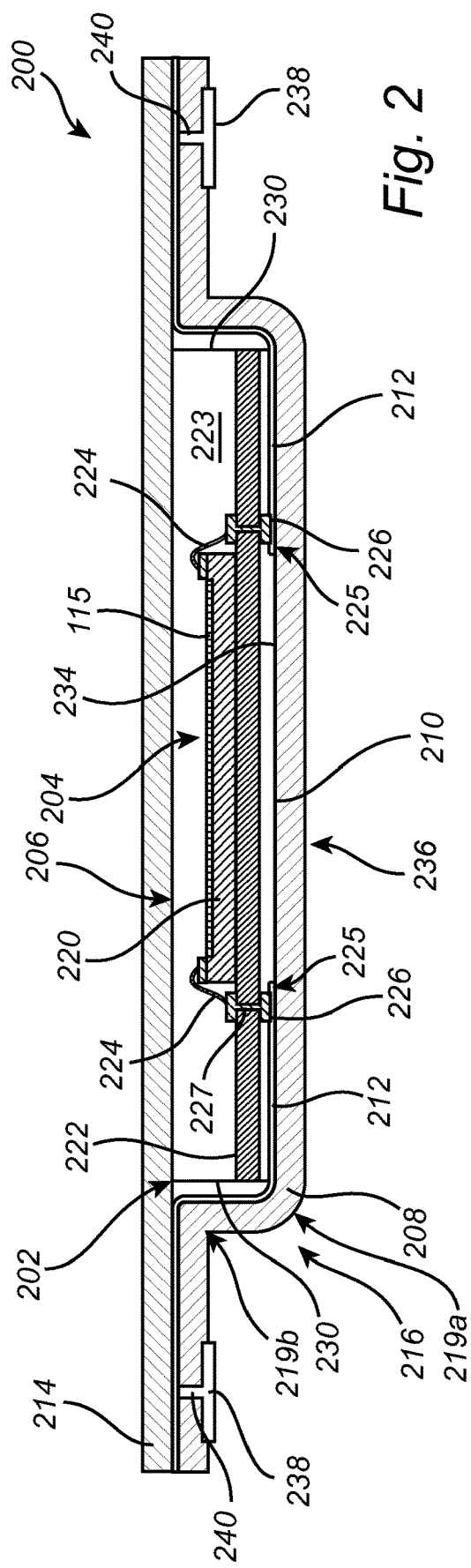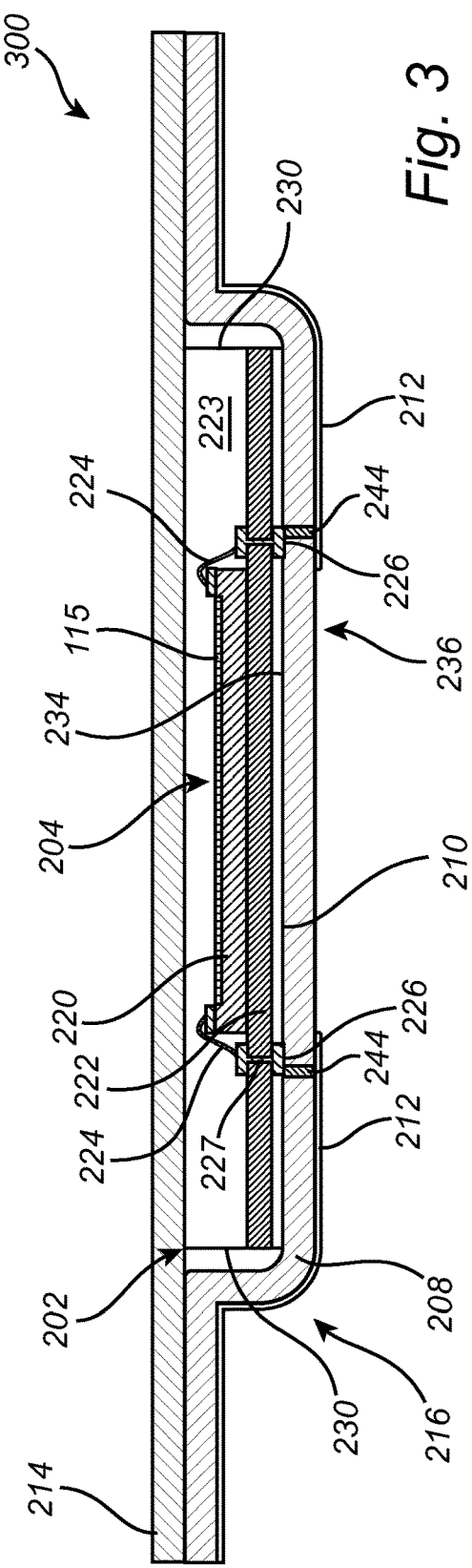

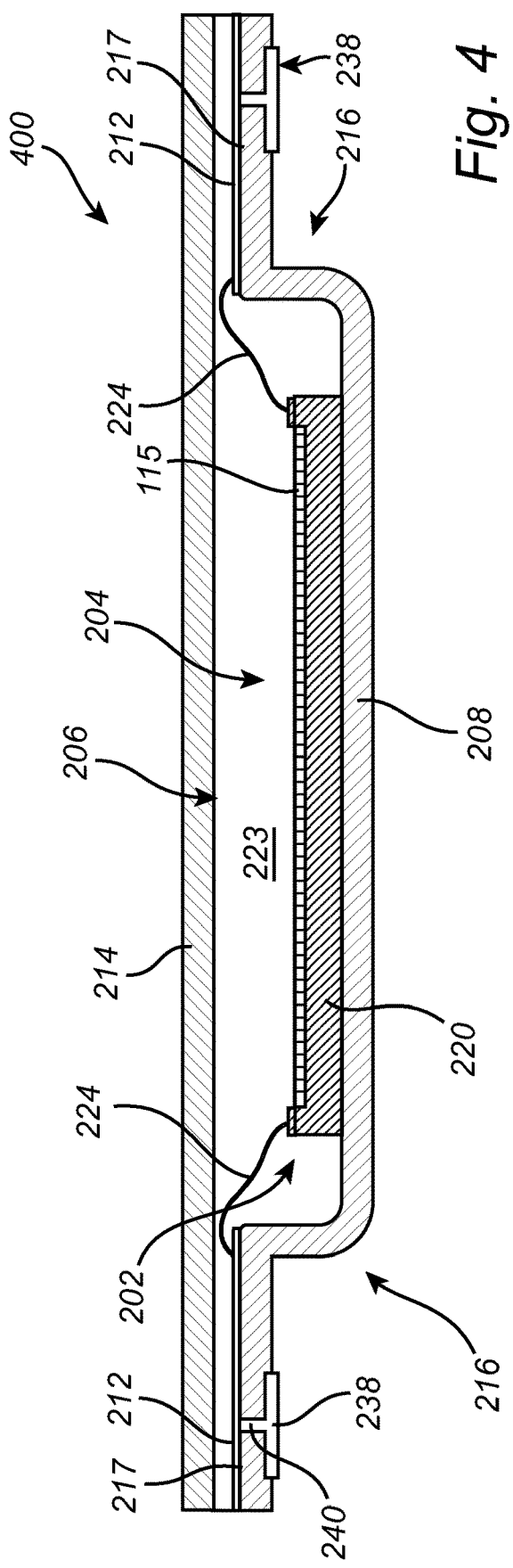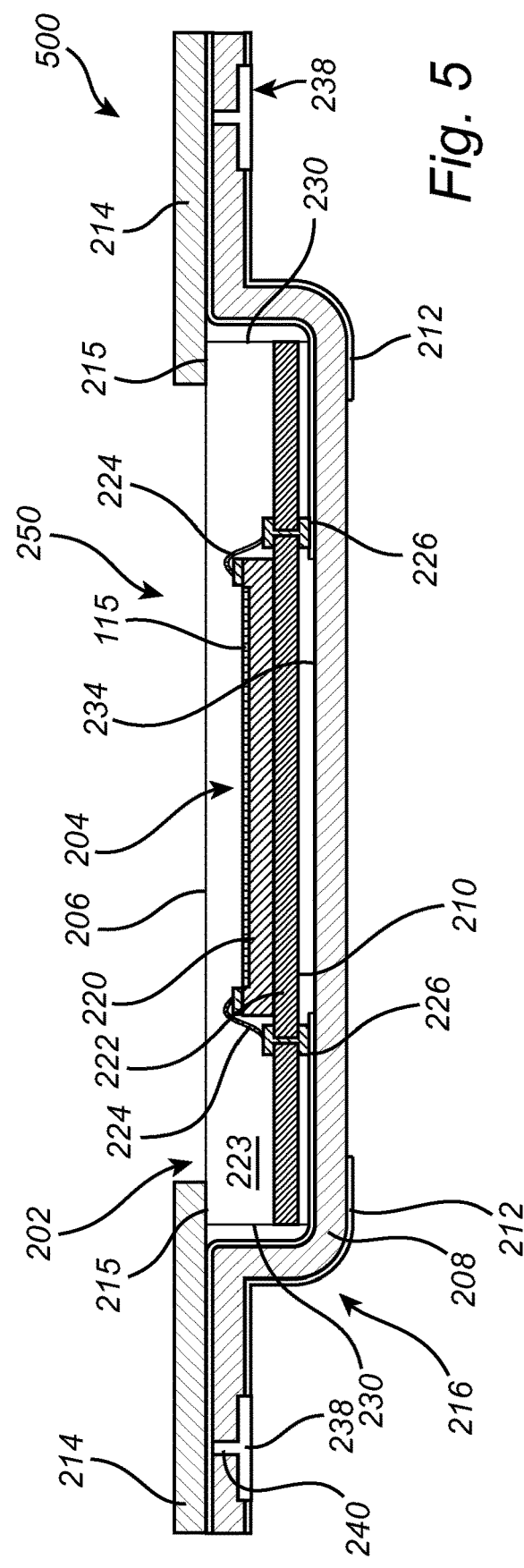

BIOMETRIC SENSOR MODULE FOR CARD INTEGRATION

CROSS-REFERENCE TO RELATED APPLICATIONS

This application is a 371 U.S. National Stage of International Application No. PCT/SE2020/051159, filed Dec. 2, 2020, which claims priority to Swedish Patent Application No. 1951439-7, filed Dec. 12, 2019. The disclosures of each of the above applications are incorporated herein by reference in their entirety.

FIELD OF THE INVENTION

The present invention generally relates to biometric sensor module for detecting a biometric feature of a user. The invention also relates to a device such as a smartcard including a biometric sensor module and to methods for assembling a biometric sensor module.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Capacitive fingerprint sensing devices, built based on CMOS technology for providing the fingerprint sensing elements and auxiliary logic circuitry can be made both small and energy efficient while being able to identify a fingerprint with high accuracy. Thereby, capacitive fingerprint sensors are advantageously used for consumer electronics, such as portable computers, tablets and mobile phones. There is also an increasing interest in using fingerprint sensors in smartcards to enable biometric identification in a card such as a bank card where other types of biometric systems are not applicable.

However, for integration of a fingerprint sensing device in a relatively thin smart card, the thickness of the fingerprint sensing device must be sufficiently small for practical integration in the smart card. Further, the fingerprint sensing device and associated electrical connections must be able to handle mechanical stress caused by bending of the smart card.

Accordingly, there appears to be room for improvements with regards to fingerprint sensing devices for card integration.

SUMMARY

In view of above-mentioned and other drawbacks of the prior art, it is an object of the present invention to provide a biometric sensor module with improved ability to handle mechanical stress.

According to a first aspect of the present invention, it is therefore provided a biometric sensor module for detecting a biometric feature of a user, the biometric sensor module comprising: a biometric sensor comprising an array of sensing elements for acquiring sensing signals indicative of a biometric feature of a user, the array of sensing elements arranged facing towards a front side of the biometric sensor. Further, the biometric sensor module comprises a bottom flexible film attached to a back side, opposite the front side, of the biometric sensor. The bottom flexible film carrying at least one electrically conductive line electrically connectable to the biometric sensor and electrically connectable to an external electrical circuit. The biometric sensor module further comprises a top film attached to the biometric sensor closer to the front side of the biometric sensor than the bottom flexible film. The flexible film includes a bent portion such that the flexible film is bent towards the top film.

The present invention is based upon the realization to attach a bottom flexible film to the biometric sensor, where the bottom flexible film includes at least one electrically conductive line electrically connectable to the biometric sensor and to the external electrical circuit. The flexible film is bent towards the top film such that it is possible to form a T-shaped biometric sensor module with wings including portions of the bottom flexible film and the top film. The wings are thinner than the main body of the biometric sensor module where the biometric sensor is located.

The bottom flexible film carries at least one electrically conductive line, which is adapted to flex with the flexible film. Thus, the electrical connection, provided by the flexible at least one electrically conductive line, between the biometric sensor and the external electrical circuit is thereby more robust against mechanical stress caused by e.g. bending, compared to the often-used bond wires used in prior art solutions.

Further, bending the bottom flexible film towards the top film such that the bottom flexible film may be directly or indirectly attached to the top film increases the thickness of the wings of the biometric sensor module compared to a single support layer. The wings being formed by the portions of the biometric sensor module adjacent to the biometric sensor, where the top film and bottom film are directly or indirectly attached to each other. For integration of a biometric sensor module into a card, it is often the case that electrical connection is made on the wing to electrical pads on shoulders of the card. With thin wings, the offset of the shoulder from the card neutral plane, i.e. the center plane, has to be increased thereby increasing the mechanical stress on the electrical conducting layer of the card, for example during card bending. With the herein proposed biometric sensor module, the wings may be made thicker compared to prior art solutions, thereby improving card reliability and at the same time the ability for the biometric sensor module itself to handle mechanical stress.

Accordingly, the present invention provides advantages related to improved ability to handle mechanical stress for the biometric sensor module. Further, the biometric sensor module provides for improved integration into a card application, such that the card reliability is improved due to the biometric sensor module configuration that allows for arranging the electrical conducting layer of the card closer to the card neutral plane.

The top film is arranged on the side of the biometric sensor module facing the same direction as the array of sensing elements, e.g. the side of a sensing surface of the biometric sensor module.

In contrast, the bottom flexible film is located on the side opposite the side of a sensing surface, although portions of the bottom flexible film are bent towards the top film. The bottom flexible film is bent in a direction parallel with an axis inclined or perpendicular to the plane of the array of sensing elements. The bottom flexible film is preferably bent sufficiently such that it may be attached to the top film.

The external electric circuit may be comprised in a device where the biometric sensor module is integrated, e.g. the device may be a smart card.

The sensing elements may, for example, be capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint. The biometric sensor may be a capacitive fingerprint sensor.

A biometric sensor such as a capacitive fingerprint sensor should be understood to further comprise sensing circuitry connected to the sensing elements for reading a signal from the sensing elements. The sensing circuitry may in turn comprise or be connected to readout circuitry for providing a result of the sensing device to an external circuit for further processing, which in the present case may be an external circuit in a smartcard.

A film as discloses herein is understood to be a relatively thin element that has a substantially larger surface area than the area of a cross-section taken in a plane perpendicular to the top or bottom surface of the film. Thus, a film is a relatively thin structure that allows for the biometric sensor to detect the biometric feature, such as a fingerprint, through the film if necessary. For example, the thickness of the films may in some implementations not exceed the thickness of the biometric sensor.

An example film thickness is in the range 10 micrometer to 200 micrometers, more preferably in the range 30 micrometer to 100 micrometer, or more preferably in the range 30 micrometer to 50 micrometer. The conductive lines on the film may have a thickness that lies in the range 5 micrometer to 50 micrometer, or in the range 10 micrometer to 25 micrometer.

Preferably, the bottom flexible film is bent along sidewalls of the biometric sensor. The bent portions of the bottom flexible film may at least partly be parallel with the side-walls of the biometric sensor. The bottom flexible film thereby covers the bottom side and the side-walls of the biometric sensor.

Advantageously, the top film may be a top flexible film. By providing for the top film to also be flexible improves the ability for the biometric sensor module to handle mechanical stress such as caused by bending.

The area(s) of the flexible film(s) preferably exceed the area of the biometric sensor. In this way is may be possible to enclose the biometric sensor between the flexible films.

In embodiments, the bottom flexible film may be bent towards and attached to the top film. This provides for flexible "wings" surrounding the biometric sensor. The bottom flexible film may be glued to the top film.

In embodiments, the biometric sensor may be attached to a first side of the bottom flexible film, the bottom flexible film further carrying at least one electrically conductive pad on a second side opposite the first side, at least one electrically conductive pad being electrically connected with at least one electrically conductive line on the first side. Thereby, both sides of the bottom flexible film are advantageously utilized for electrically conducting structures. Further, the electrically conductive pad on the second side provides an advantageous location for connections with the external electric circuit.

Accordingly, the at least one electrically conductive pad may advantageously be adapted to provide the electrical connection to the external electrical circuit.

In embodiments, the at least one electrically conductive line may be arranged on the same side of the bottom flexible film as the biometric sensor. This facilitates for electrically connecting the biometric sensor to the at least one electrically conductive line.

Further, at least one electrically conductive line may arranged on a side of the bottom flexible film opposite the biometric sensor. The bottom flexible film may carry electrically conductive lines on both sides, thereby improving the routing possibilities on the bottom flexible film. Electrically conductive lines on opposite sides of the bottom flexible film may be connected.

A thickness of the biometric sensor module may be larger where the biometric sensor is located compared to portions of the biometric sensor module neighboring the biometric sensor and the bent portion of the bottom flexible film. Thus, the biometric sensor module may be provided as a generally T-shaped module with wings being thinner than a center portion where the biometric sensor is located.

In some embodiments, the electrically conductive lines are electrically connectable to the biometric sensor on the back side of the biometric sensor. Thus, attaching the bottom flexible film with its electrically conductive lines aligned with the electrical connection pads on the back side of the biometric sensor provides a convenient way for obtaining an electrical connection with the biometric sensor.

Alternatively, the electrically conductive lines may electrically connectable to the biometric sensor from a side facing towards the front side of the biometric sensor through bonding wires.

The top film may be arranged to cover at least a portion of the front side of the biometric sensor.

In other embodiments, the top film may be arranged to cover at least a portion of the array of sensing elements on the front side of the biometric sensor.

The biometric sensor may be sandwiched between the top film and the bottom flexible film carrying at least one electrically conductive line. Further, the biometric sensor may be enclosed between the top film and the bottom flexible film.

In some embodiments, the top film may include an opening where the biometric sensor is located, wherein side walls of opening in the top film is attached to side walls of the biometric sensor. During assembly, the biometric sensor may be inserted through the opening.

In embodiments, the at least one electrically conductive line may be arranged in the bent portion of the bottom flexible film, wherein at least one of the electrically conductive lines is adapted to electrically connect the biometric sensor to the external electrical circuit via the bent portion. Accordingly, the at least one of the electrically conductive lines conforms with the flexible film, providing electrical paths with improved ability to handle mechanical stress compared to e.g. conventional bond wires.

According to a second aspect of the present invention, there is provided a device including the biometric sensor module according to the present disclosure, the device comprising a bendable main body carrying the external electrical circuit, wherein the biometric sensor module is arranged in an opening of the electronic device.

Preferably, the device comprises electrical pads arranged on shoulders in the opening electrically connected to the external circuit, wherein the electrically conductive lines of the biometric sensor module are electrically connected to the electrical pads on the shoulders.

The external circuit includes processing circuitry that may be configured to: receive a signal from the biometric sensor module indicative of a fingerprint of a finger touching a sensing surface of the biometric sensor module and perform a fingerprint authentication procedure based on the detected fingerprint.

Fingerprint authentication procedures are known per se, and generally includes to compare features of a verification representation constructed based on an acquired fingerprint image, with features of an enrollment representation constructed during enrollment of a user. If a match with sufficiently high score is found, the user is successfully authenticated.

The device may preferably be a smart card. The smartcard can be considered to be formed as a laminate structure comprising a plurality of layers, such as a carrier layer and outer layers on respective sides of the carrier layer. Typically, the smartcard will also comprise one or more electrically conductive layers embedded in the card to route electrical signals between different parts of the card.

Further embodiments of, and effects obtained through this second aspect of the present invention are largely analogous to those described above for the first aspect of the invention.

According to a third aspect of the invention, there is provided a method for assembling a biometric sensor module, comprising: providing a biometric sensor comprising an array of sensing elements for acquiring sensing signals indicative of a biometric feature of a user, the array of sensing elements arranged facing towards a front side of the biometric sensor; attaching the biometric sensor to a top film at the front side; attaching a flexible film to a back side, opposite the front side, of the biometric sensor, the flexible film carrying at least one electrically conductive line; forming an electrical connection between at least one electrically conductive line and the biometric sensor, bending the flexible film towards the top film along sides of the biometric sensor, such that the flexible film is attachable to the top film adjacent to bent portions of the flexible film.

The flexible film may be attached to the top film adjacent to the bent portions.

In embodiments, wherein the flexible film may be bent such that at least one of the electrically conductive lines is bent towards the top film, wherein at least one of the electrically conductive lines is adapted to electrically connect the biometric sensor to an external electrical circuit via the bent portion.

Further embodiments of, and effects obtained through this third aspect of the present invention are largely analogous to those described above for the first aspect and the second aspect of the invention.

According to a fourth aspect of the invention, there is provided a method for assembling a biometric sensor module, comprising: providing a biometric sensor comprising an array of sensing elements for acquiring sensing signals indicative of a biometric feature of a user, the array of sensing elements arranged facing towards a front side of the biometric sensor; attaching a flexible film to a back side, opposite the front side, of the biometric sensor, the flexible film carrying at least one electrically conductive line; forming an electrical connection between at least one electrically conductive line and the biometric sensor, attaching the biometric sensor to a top film closer to the front side of the biometric sensor than the flexible film; bending the flexible film towards the top film along sides of the biometric sensor, such that the flexible film is attachable to the top film adjacent to bent portions of the flexible film.

Further embodiments of, and effects obtained through this fourth aspect of the present invention are largely analogous to those described above for the other aspects of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 2 is a schematic side-view of a biometric sensor module according to an example embodiment of the present invention;

FIG. 3 is a schematic side-view of a biometric sensor module according to an example embodiment of the present invention;

FIG. 4 is a schematic side-view of a biometric sensor module according to an example embodiment of the present invention;

FIG. 5 is a schematic side-view of a biometric sensor module according to an example embodiment of the present invention;

DETAILED DESCRIPTION OF EXAMPLE EMBODIMENTS

In the present detailed description, various embodiments of the biometric sensor module and method according to the present invention are mainly described with reference to a smartcard and a biometric sensor module including a capacitive fingerprint sensor for integration in the smartcard.

However, embodiments of the present disclosure may also be employed for other types of biometric devices suitable for use in a smartcard.

Figure 1A:
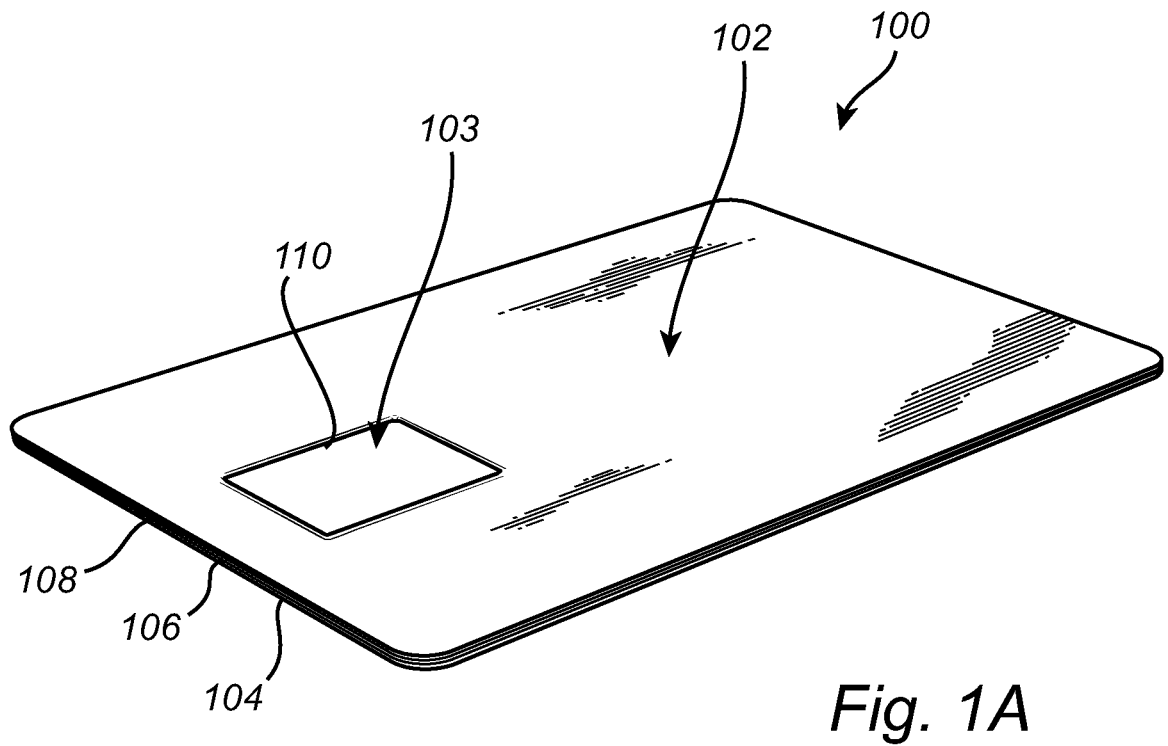
FIG. 1A schematically illustrates a smartcard including a biometric sensor module according to an example embodiment of the present invention.

FIG. 1A schematically illustrates a smartcard 100 according to an embodiment of the invention. The smartcard 100 is comprising a biometric sensor module 103 according to embodiments of the present disclosure. The smartcard 100 comprises a bendable main body 102 made in a laminated structure comprising a plurality of layers 104, 106, 108. The biometric sensor module 103 is arranged in an opening 110 in the outermost layer 108 layer of the smartcard 100. The main body 102 is adapted to carry an electrical circuit external to the biometric sensor module 103. The layers 106 is an inlay layer which may comprise various electrically conductive traces acting as antennas and for connecting electronic components that may be included in the card 100. Layers 104 and 108 are outer layers protecting the inlay layer 106 and may include cosmetic decoration and printing. The layers 104, 106, 108 may be made of PVC and be laminated together.

Figure 1B:
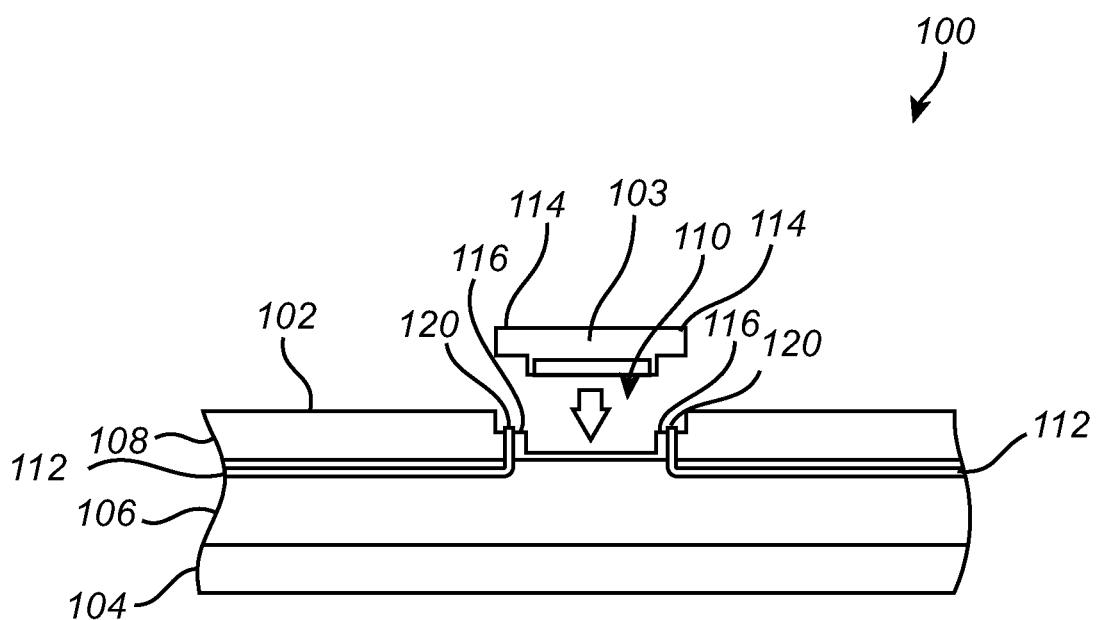
FIG. 1B is a conceptual partial side-view of the smartcard in FIG. 1A.

FIG. 1B is a conceptual partial side-view of the smartcard 100. In the side-view, the biometric sensor module 103 is substantially T-shaped with wings 114 that are adapted to rest on shoulder portions 116 of the smartcard 100 in the opening 110. The electrically conductive layer 112 of the smartcard 100, embedded in the carrier layer 106, includes electrical pads 120 that extends out from the layer 106 and onto the shoulders 116 of layer 108. The electrical pads 120 arranged on the shoulders 116 in the opening are electrically connected to the external circuit (not shown).

The external circuit of the smartcard 100 may include a control unit, or generally processing circuitry configured to: receive a signal from the biometric sensor module indicative of a fingerprint of a finger touching a sensing surface of the biometric sensor module, and perform a fingerprint authentication procedure based on the detected fingerprint.

FIG. 2 is a side-view of a biometric sensor module 200 according to an example embodiment of the present invention. The biometric sensor module 200 comprises a biometric sensor 202 comprising an array 204 of sensing elements 115 for acquiring sensing signals indicative of a biometric feature of a user, the array of sensing elements arranged facing towards a front side 206 of the biometric sensor 202.

A bottom flexible film 208 is attached to a back side 210, opposite the front side 206, of the biometric sensor 202, the bottom flexible film 208 carrying at least one electrically conductive line 212 electrically connectable to the biometric sensor 202 and electrically connectable to an external electrical circuit.

Further, a top film 214 is attached to the biometric sensor 202 closer to the front side 206 of the biometric sensor than the bottom flexible film 208. The bottom flexible film 208 includes a bent portion 216 such that the bottom flexible film 208 is bent towards the top film 214.

Preferably, the bottom flexible film 208 is bent towards the top film 214 to be fixed in relation to the top film. In other words, the bottom flexible film 208 may be either directly or indirectly attached to the top film 214.

The size and number of sensing elements 115 is here selected only for clarity in the drawing.

The biometric sensor 202 is sandwiched between the bottom flexible film 208 and the top film 214. Thus, the biometric sensor 202 may be enclosed between the films 208 and 214. The top film 208 may be adapted to provide mechanical support for the biometric sensor 202.

The thicknesses of the films, the conductive lines, connection pads, are selected to provide clarity in the drawings and are not necessarily to scale. This also applies to the biometric sensor and other elements or spacings between elements in the drawings.

The bottom flexible film 208 is continuous through the bent portion 216. Thus, the bottom flexible film 208 is bendable such that it can be orthogonally bent from below the biometric sensor 202 and towards the top film 214. In the presently described embodiment, one part of the bottom film 208 is substantially parallel the back side 210 of the biometric sensor 202, and another part in the bent portion 216 is substantially parallel with the side-walls 230 of the biometric sensor 202. Further, where the top film and bottom film are attached to each other, they are also parallel with each other.

Accordingly, the bent portion 216 of the bottom flexible film may include a first bend 219a and a second bend 219b. The first bend 219a bends the bottom film so that part of the bent portion 216 is arranged along, e.g. parallel with, the side walls 230. The second bent portion 219b bends the bottom flexible film 208 back, to be parallel with the bottom film at the back side 210 of the biometric sensor. The bent portion 216 may thus provide a general S-shaped cross-section. The bottom flexible film 208 bends upwards towards the top film 214.

Here, the biometric sensor 202 includes a sensor die 220 attached to a circuit board or substrate 222. An encapsulation material, e.g. an epoxy molding compound (EMC) 223 encapsulates the sensor die 220 and the substrate 222, and bond wires 224 for providing electrical connection between the sensor die 220 and the sensor 222.

Further, the conductive paths of the substrate 222 of the biometric sensor 202 are connected to a set of electrical connection pads 225 on the bottom film 208 that are connected to respective electrically conductive lines 212 on the bottom flexible film 208. The electrical connection pads 225 are connected to corresponding pads 226 arranged on the back side 210 of the biometric sensor. The bond wires 224 are electrically connected to the corresponding connection pads 226 on the back side 210 of the biometric sensor 202 through e.g. vertical interconnect access (VIA) leads 227 through the substrate 222.

The bottom flexible film 208 is at least partly arranged bent along side-walls 230 of the biometric sensor 202. The bottom flexible film 208 is further attached to the top film 214, for example by means of gluing.

In the presently described embodiment, the biometric sensor 202 is attached to a first side 234 of the bottom flexible film 208. The bottom flexible film 208 further carrying at least one electrically conductive pad 238 on a second side 236 opposite the first side 234. At least one electrically conductive pad 238 being electrically connected with at least one electrically conductive line 212. Here, the electrically conductive pad 238 and the electrically conductive line 212 are connected through VIAs 240 through the bottom flexible film 208. The electrically conductive pad 238 may e.g. be directly connected to the external electrical circuitry or the electrically conductive pad 238 may be connected to further electrically conductive lines on the second side 236 for routing of signals to the external electrical circuitry.

The electrically conductive pads 238 are adapted to provide the electrical connection to the external electrical circuit. Accordingly, the electrically conductive pads 238 are electrically connected to the external electrical circuit through additional lead or conductive paths.

In the presently described embodiment, the at least one electrically conductive line 212 is at least partly arranged in the bent portion 216 of the bottom flexible film 208. In this way, at least one of the electrically conductive lines 212 is adapted to electrically connect the biometric sensor 202 to the external electrical circuit via the bent portion 216. Thus, also the electrically conductive line 212 is bent conformally with the bottom flexible film 208.

In the embodiment of FIG. 2, the at least one electrically conductive line 212 are arranged on the same side of the bottom flexible film 208 as the biometric sensor 202. However, in other possible embodiments, for example the biometric module 300 as illustrated in FIG. 3, the at least one electrically conductive line 212 is carried by the bottom flexible film 208 on the opposite side from the biometric sensor 202, i.e. on the side 236. For this, the electrical connection pads 226 may be attached to the at least one electrically conductive line 212 through connections 244 extending through the bottom flexible film 208. The electrically conductive lines 212 provide the electrical connection to the external electric circuit.

FIG. 4 illustrates a further embodiment of a biometric sensor module 400. Here the biometric sensor 202 includes the sensor die 220 that is attached, e.g. via glue, on the bottom flexible film 208. In other words, the circuit board or substrate described with reference to preceding drawings is omitted. Instead, the electrically conductive lines 212 are electrically connectable to the biometric sensor 202 on the front side 206 of the biometric sensor through bonding wires 224. Thus, the electrically conductive lines 212 that are adapted to connect the biometric sensor 202 to the external circuit, are not carried through the bent portions 216.

The electrically conductive lines 212 are here arranged on a portion 217 of the bottom flexible film 208 adjacent the bent portion 216 and opposite from the biometric sensor 202 relative the bent portion 216, but on the same side of the bottom flexible film 208. An encapsulating material 223 is applied to protect the sensor die 220.

In the embodiments described with reference to FIGS. 2-4, the top film, e.g. top flexible film 214, is arranged to cover the front side 206 of the biometric sensor 202, and to cover the array 204 of sensing elements. This provides a protective layer for the biometric sensor 202. The top flexible film 214 is attached to the front side 206 of the biometric sensor 202.

Turning to FIG. 5 schematically illustrating a side-view of a further embodiment of a biometric sensor module 500. Here the top film 214 is attached to the front side 206 of the sensing module 202. However, the top film 214 is arranged to cover a portion 215 of the front side 206 of the biometric sensor 202. Accordingly, the top film 214 includes an opening 250 through which at least part of the sensing front side 206 is exposed. In this way, less material is present between a finger and the array 204 of sensing elements, thereby improving the quality of acquired fingerprint images.

In addition, as is applicable to various embodiments of the present invention but exemplified here in FIG. 5, the bottom flexible film may carry electrically conductive lines 212 on both sides, i.e. on the first side 234 and on the second side 236. The electrically conductive lines are adapted to connect the biometric sensor to external circuitry and may also be adapted to route other signals through the bottom flexible film, between electrically conductive lines located on the first side and the second side which provides for improved possibilities for routing signals to and from the biometric sensor. For example, the bent portion 216 of the bottom flexible film 208 may carry electrically conductive lines on the first side 234 and on the second side 236.

Figure 6:
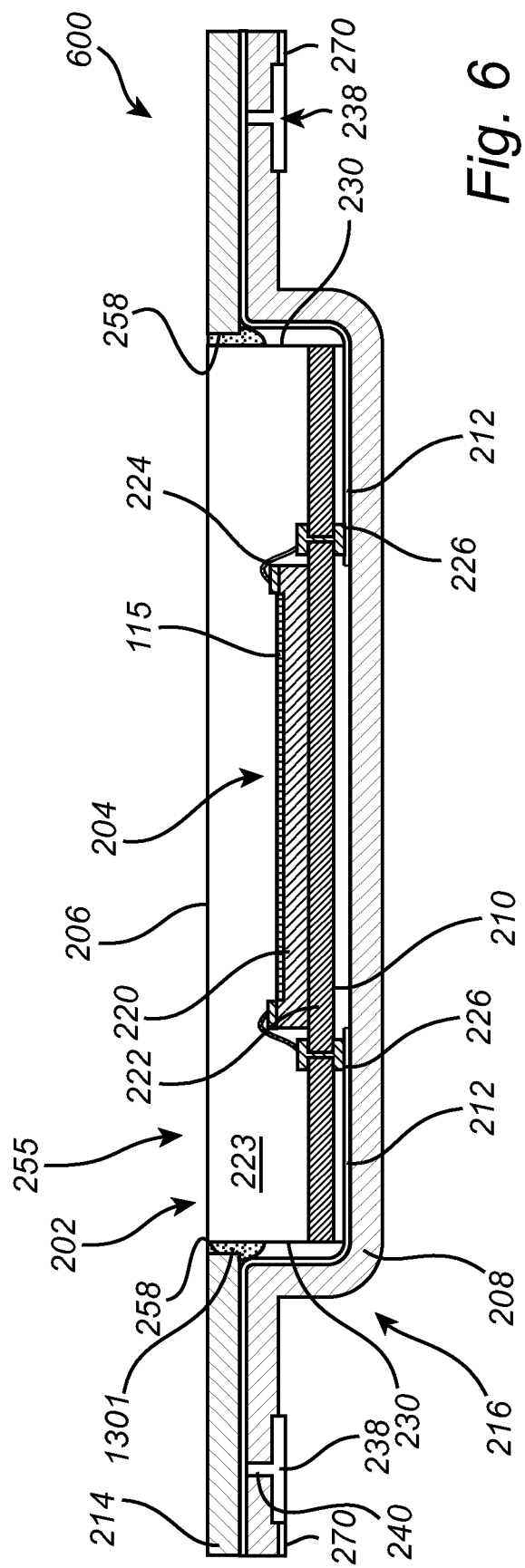
FIG. 6 is a schematic side-view of a biometric sensor module according to an example embodiment of the present invention.

Turning to FIG. 6 which schematically illustrates a side-view of a further embodiment of a biometric sensor module 600. Here, the top film 214 includes an opening 255 where the biometric sensor 202 is located. Side walls 258 of the opening in the top film is attached to side walls 230 of the biometric sensor 202, by e.g. glue 1301 or any suitable adhesive. The side walls 230 are made of the encapsulation material, e.g. an epoxy molding compound (EMC) 223.

The connection from the electrically conductive pads 238 to the external electrical circuit may be provided in various directions, suitable for the specific implementation. For example purposes, in, FIG. 6, a further electrically conductive lines 270 are carried on the second side of the bottom flexible film 208, for routing signals to the external electrical circuit. Such further electrically conductive lines carried on the second or first side of the bottom flexible film may be implemented in any of the other embodiments.

Figure 7:
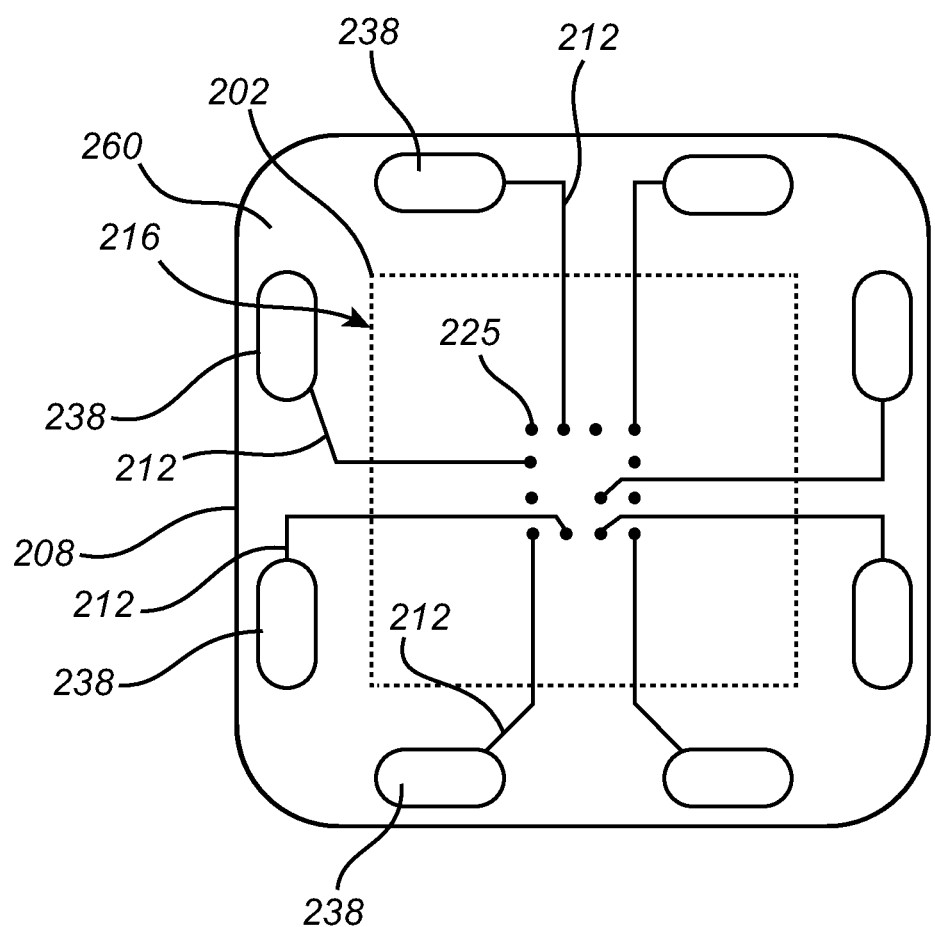
FIG. 7 illustrates an example layout of the bottom flexible film and the biometric sensor.

FIG. 7 illustrates an example layout of the electrically conductive lines 212 (not all are numbered) embedded in the bottom flexible film 208, the electrically conductive pads 238 that are connectable to the external circuit, and the electrical connection pads 225 connectable to the sensor 202, e.g. via connection pads 226 of the biometric sensor 202, see e.g. FIG. 2,3, 5, 6. The biometric sensor outline 202 is shown in FIG. 7.

The electrical connection pads 225 connectable to the sensor 202 are underneath the sensor 202 and may be connected to the sensor 202 with ACF (anisotropic conductive film) bonding or soldering. The electrically conductive pads 238 are arranged on the wing 260, i.e. the part of the bottom flexible film 208 that extends beyond the sensor 202. The wing 260 is not underneath the sensor 202. For this, the area of the bottom flexible film 208 exceeds the area of the biometric sensor 202, as illustrated in FIG. 7. Preferably, the area of the top flexible film also exceeds the area of the biometric sensor 202.

The two sets of electrical connection pads 225, and 238 are connected by the electrically conductive lines 212 carried by, or embedded in the bottom flexible film 208. The bottom flexible film 208 bends upwards after extending beyond the sensor and glues with the top film, thereby forming a bent portion 216, schematically denoted here, adjacent to the sensor 202. Note that the electrically conductive lines 212, the electrically conductive pads 238 and 226, may or may not be arranged on the same side of the bottom flexible film 208, as is understood from the embodiments described with reference to FIGS. 2-6. FIG. 7 is intended to illustrate an example layout without regards to in which plane of the flexible film the electrically conductive lines 212, and the electrically conductive pads 238 and 226 are located.

Figure 8:
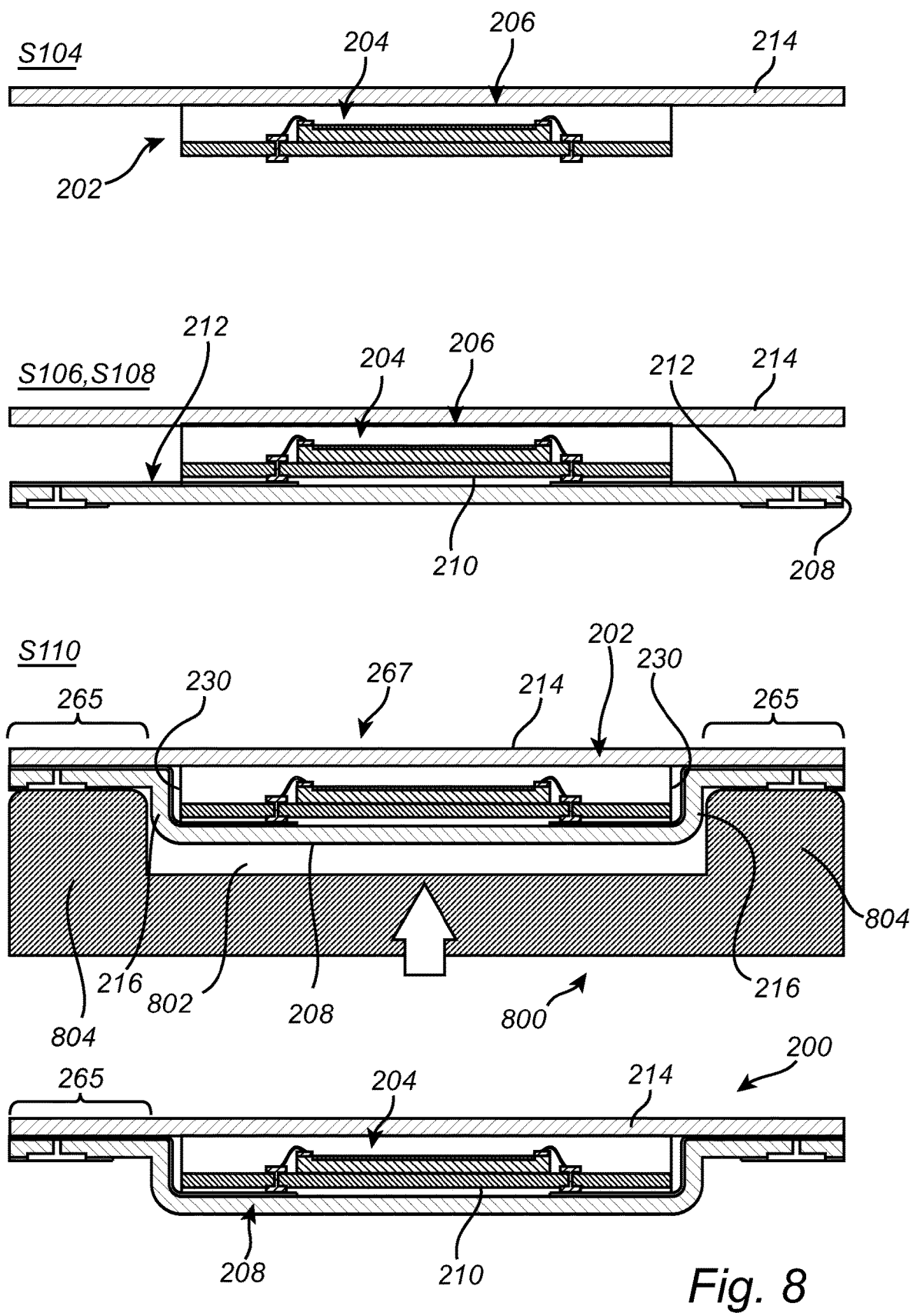
FIG. 8 conceptually illustrates method steps for manufacturing a biometric sensor module according to embodiments of the present invention.
Figure 9:
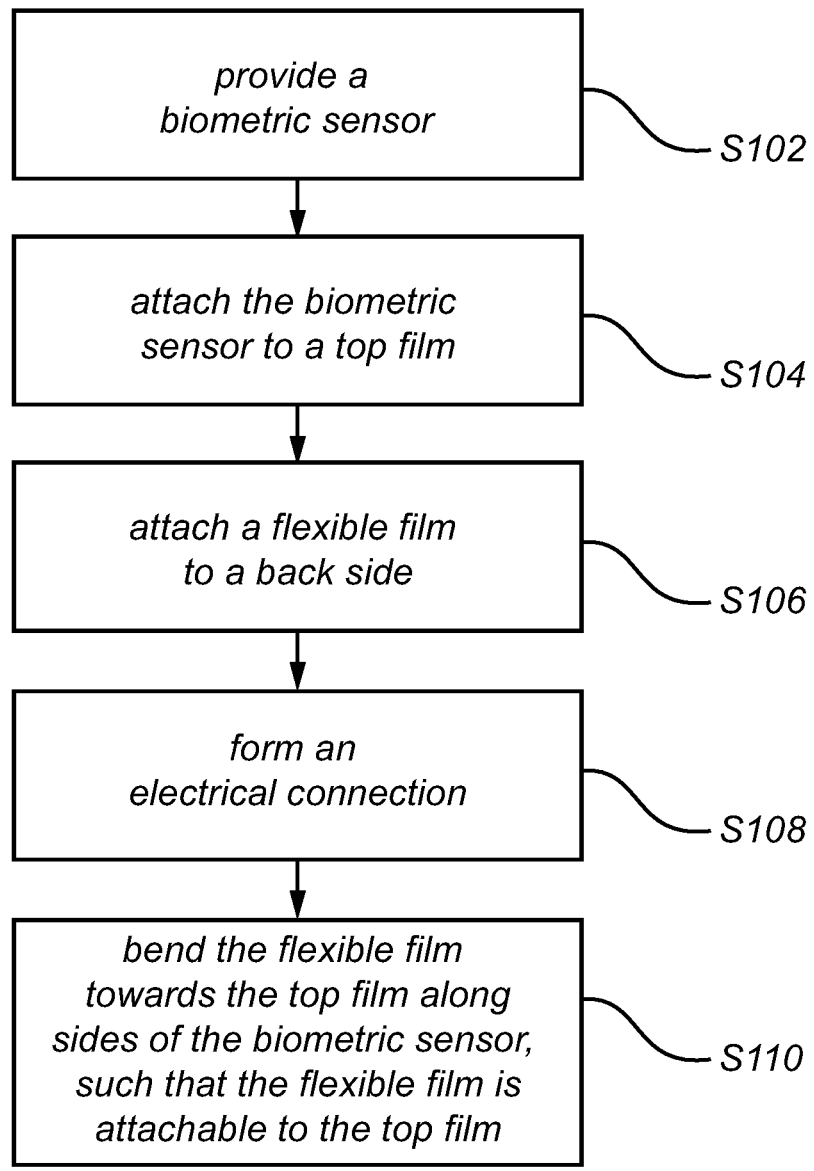
FIG. 9 is a flow-chart of method steps for manufacturing a biometric sensor module according to embodiments of the present invention.

Turning now to FIG. 8 which conceptually illustrates method steps for manufacturing a biometric sensor module according to embodiments of the invention. FIG. 9 is a flow chart of the corresponding method steps.

In step S102, providing a biometric sensor 202 comprising an array 204 of sensing elements for acquiring sensing signals indicative of a biometric feature of a user. The array of sensing elements arranged towards a front side 206 of the biometric sensor.

In step S104, attaching the biometric sensor 202 to a top film 214. The top film may be glued to the biometric sensor 202. Further, in step S106 attaching a flexible film 208 to a back side 210, opposite the front side 206, of the biometric sensor 202. The flexible film may be bonded to the back side 210 with thermal compression. The flexible film 208 carrying at least one electrically conductive line 212.

In step S108, forming an electrical connection between at least one electrically conductive line 212 and the biometric sensor 202. The electrical connection may be established through solder joints or particles of ACF.

In subsequent step S110, bending the flexible film 208 towards the top film 214 along sides 230 of the biometric sensor 202, such that the flexible film 208 is attachable to the top film 214 adjacent to bent portions 216 of the flexible film 208. The bending and attaching may be performed using a thermal compression tool 800 having a pocket 802 at the location of the sensor 202, and side portions 804 that press on and heat the flexible film 208 at portions adjacent the biometric sensor such that a wing 265 is formed that is thinner than the center portion 267 where the biometric sensor 202 is located, resulting in e.g. the biometric sensor module 200.

Figure 10:
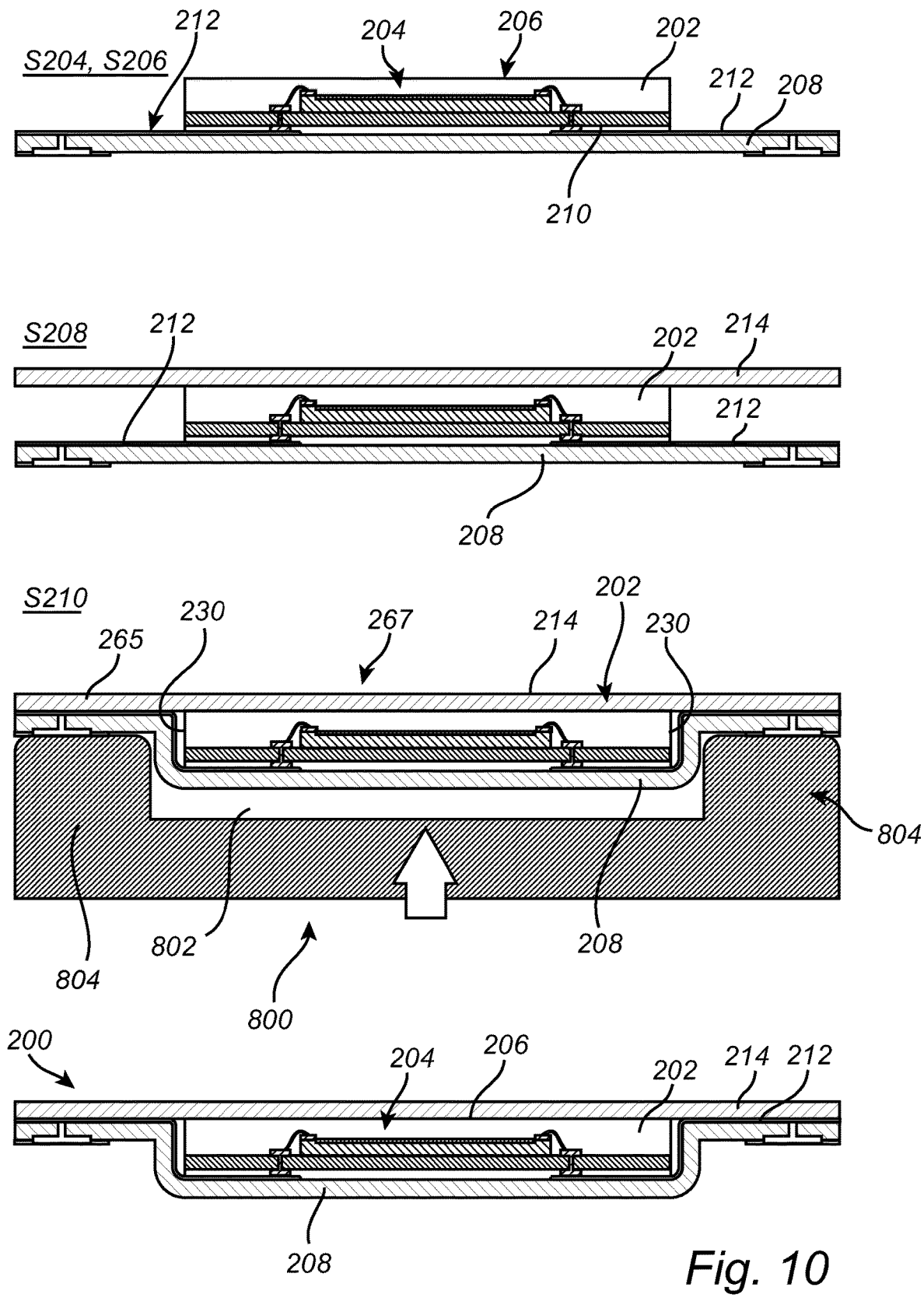
FIG. 10 conceptually illustrates method steps for manufacturing a biometric sensor module according to embodiments of the present invention.
Figure 11:
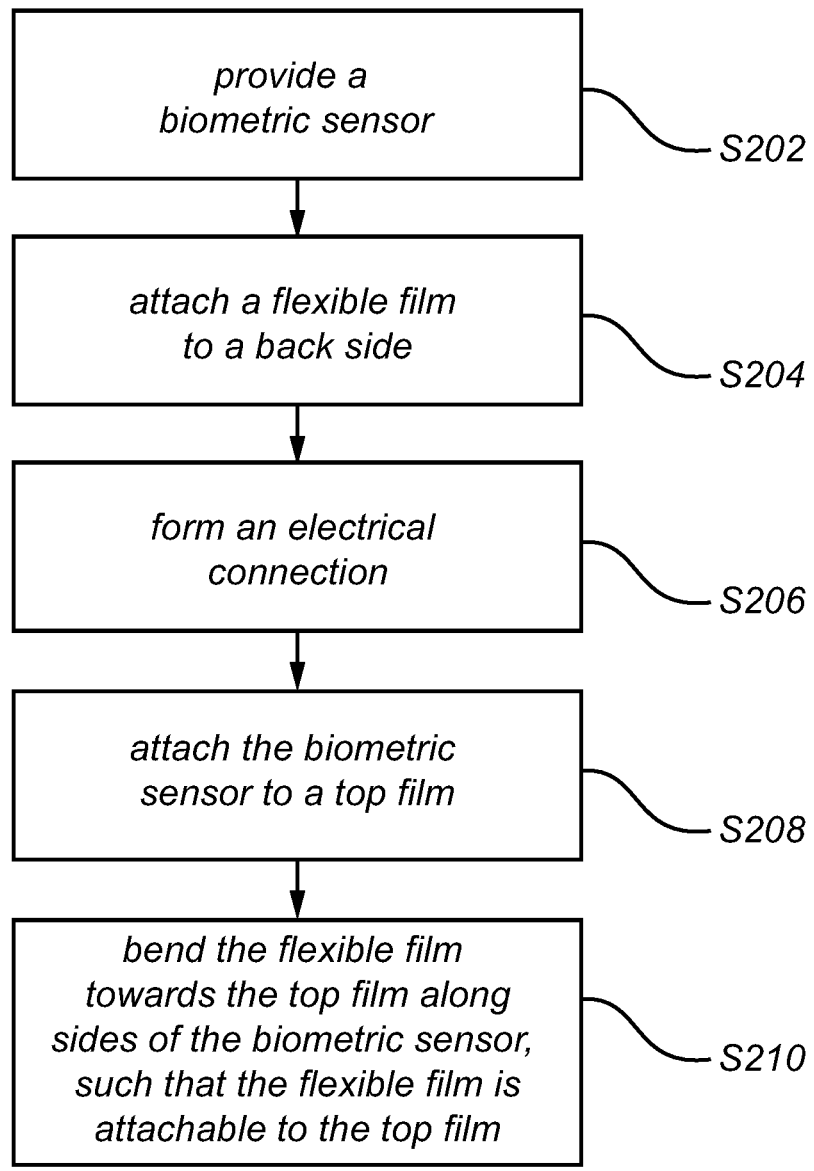
FIG. 11 is a flow-chart of method steps for manufacturing a biometric sensor module according to embodiments of the present invention.

Turning now to FIG. 10 which conceptually illustrates method steps for manufacturing a biometric sensor module according to further embodiments of the invention. FIG. 11 is a flow chart of the corresponding method steps.

In step S202 providing a biometric sensor 202 comprising an array 204 of sensing elements for acquiring sensing signals indicative of a biometric feature of a user. The array of sensing elements arranged facing towards a front side 206 of the biometric sensor. In step S204 attaching a flexible film 208 to a back side 210, opposite the front side 206, of the biometric sensor 202. The flexible film may be bonded to the back side 210 with thermal compression. The flexible film 208 carrying at least one electrically conductive line 212.

In step S206, forming an electrical connection between at least one electrically conductive line 212 and the biometric sensor 202. The electrical connection may be established through solder joints or particles of ACF.

In step S208, attaching the biometric sensor 202 to a top film 214. The top film may be glued to the biometric sensor 202. In subsequent step S210, bending the flexible film 208 towards the top film 214 along sides 230 of the biometric sensor 202, such that the flexible film 208 is attachable to the top film 214 adjacent to bent portions 216 of the flexible film 208. The bending and attaching may be performed using the thermal compression tool 800.

Figure 12:
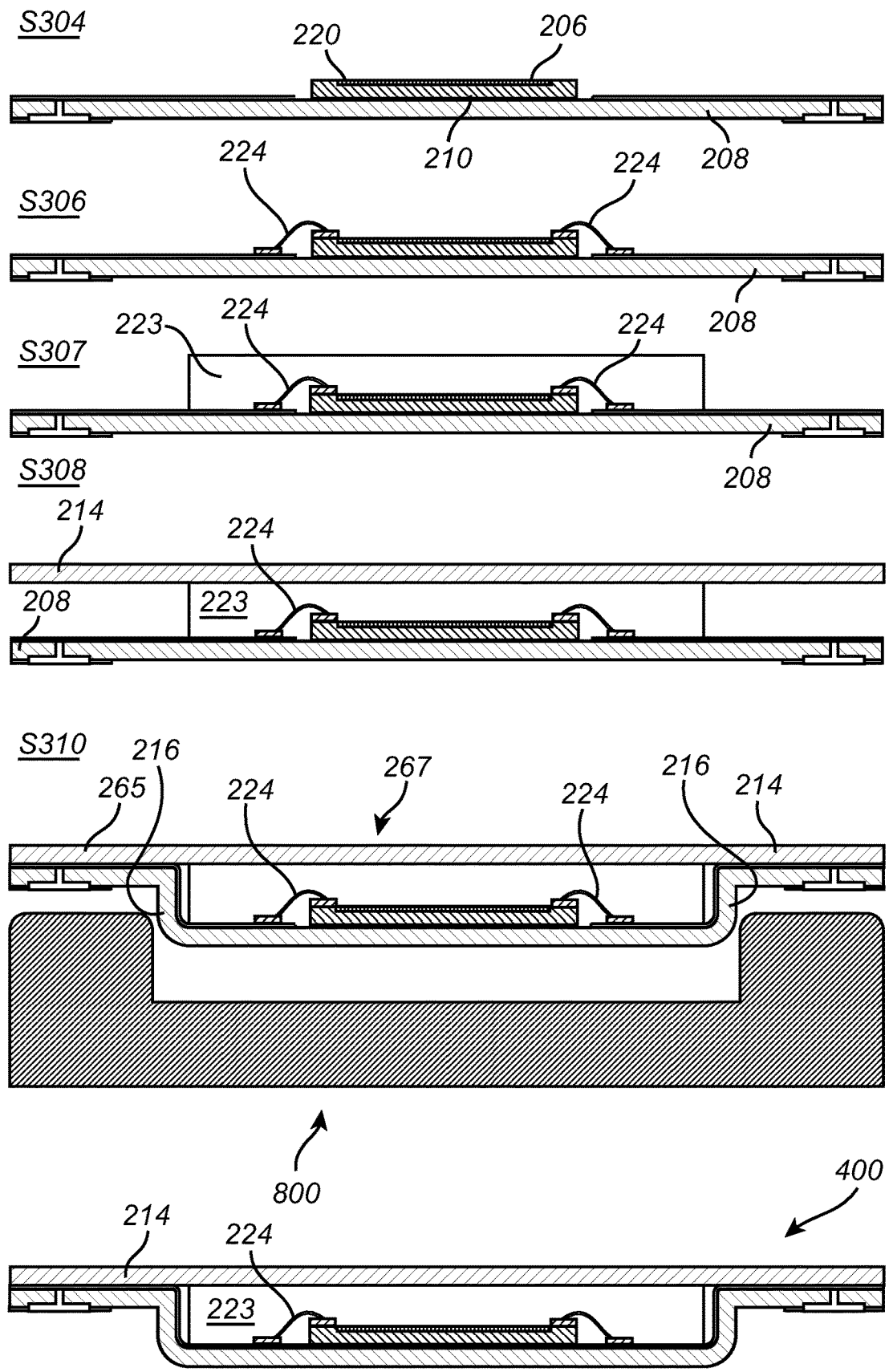
FIG. 12 conceptually illustrates method steps for manufacturing a biometric sensor module according to embodiments of the present invention.

FIG. 12 illustrates another embodiment of manufacturing the biometric sensor module 400 according to embodiments. Here, attaching, S304 a flexible film 208 to a back side 210, opposite the front side 206, of the biometric sensor 202. The flexible film 208 is attached directly to the sensor die 220.

Next, forming an electrical connection between least one electrically conductive line 212 and the biometric sensor 202 in step S306, by wire bonding.

In step S307 is encapsulating applied to protect the sensor die 220 and bond wires 224. The top film is attached in step S308 and bending the flexible film 208 towards the top film 214 is performed in step S310 in ways described above.

Figure 13:
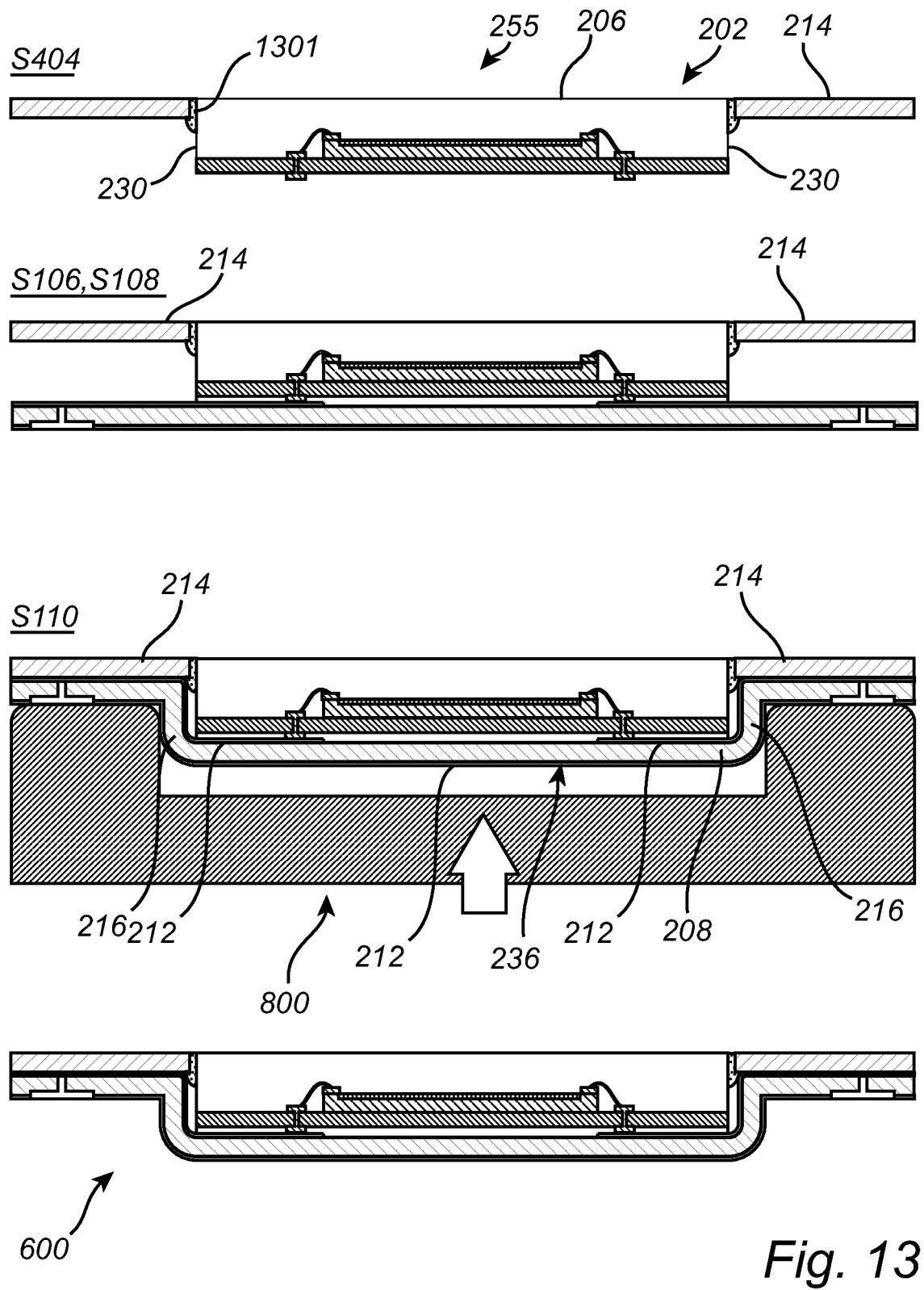
FIG. 13 conceptually illustrates method steps for manufacturing a biometric sensor module according to embodiments of the present invention.

FIG. 13 illustrates yet another scheme for manufacturing a biometric sensor module 600 according to embodiments of the present invention. Here, the top film is attached to the biometric sensor in step S404. In contrast to other embodiments, here the top film 214 has an opening 255 where the sensor 202 is inserted. The biometric sensor 202 is firstly fixed with adhesive 1301 deposited along the side walls 230 of the biometric sensor 202. The side walls are here made of the encapsulating material 223 of the biometric sensor comprised in the land grid array (LGA) of the biometric sensor. Subsequently the bottom flexible film 208 is attached to the biometric sensor in step S106 as described above, whereby steps S108 and S110 follow as above.

FIG. 13 further illustrates electrically conductive lines on both sides of the bottom flexible film.

In accordance with the invention, preferably, the top film is a top flexible film. The top film and the bottom flexible film may be made of PI (polyimide), PET (Polyethylene terephthalate), epoxy with a glass fiber core or other polymer materials.

The electrically conductive lines may be metal lines. Further, the electrically conductive pads may be metal pads. Additionally, other electrically conductive elements or connections described herein may be made from a metal. Example metals are copper, nickel, and gold, and combinations thereof, although other metals may be used and are within the scope of the present invention. For example, the electrically conductive lines may have a bottom layer of copper, and protective layers of nickel and gold, where gold may be the topmost layer. However, it may also be possible to use a single metal or two metals for realizing the electrically conductive lines.

A control unit (e.g. a controller) or processing circuitry in accordance with the invention may include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A biometric sensor module for detecting a biometric feature of a user, the biometric sensor module comprising:
   a biometric sensor comprising an array of sensing elements for acquiring sensing signals indicative of a biometric feature of a user, the array of sensing elements arranged facing towards a front side of the biometric sensor;
   a bottom flexible film attached to a back side, opposite the front side, of the biometric sensor, the bottom flexible film carrying at least one electrically conductive line electrically connectable to the biometric sensor and electrically connectable to an external electrical circuit,
   a top film attached to the biometric sensor closer to the front side of the biometric sensor than the bottom flexible film,
   wherein the bottom flexible film includes a bent portion such that the bottom flexible film is bent towards the top film, and
   wherein the biometric sensor is attached to a first side of the bottom flexible film, the bottom flexible film further carrying at least one electrically conductive pad on a second side opposite the first side, the at least one electrically conductive pad being electrically connected with at least one electrically conductive line.

2. The biometric sensor module according to claim 1, wherein the bottom flexible film is bent along side-walls of the biometric sensor.

3. The biometric sensor module according to claim 1, wherein the top film is a top flexible film.

4. The biometric sensor module according to claim 1, wherein the area of the bottom flexible film exceeds the area of the biometric sensor.

5. The biometric sensor module according to claim 1, wherein the bottom flexible film is bent towards and attached to the top film.

6. The biometric sensor module according to claim 1, wherein the at least one electrically conductive pad is adapted to provide the electrical connection to the external electrical circuit.

7. The biometric sensor module according to claim 1, wherein the at least one electrically conductive line is arranged on the same side of the bottom flexible film as the biometric sensor.

8. The biometric sensor module according to claim 1, wherein at least one electrically conductive line is arranged on a side of the bottom flexible film opposite the biometric sensor.

9. The biometric sensor module according to claim 1, wherein a thickness of the biometric sensor module is larger where the biometric sensor is located compared to portions of the biometric sensor module neighboring the biometric sensor and the bent portion of the bottom flexible film.

10. The biometric sensor module according to claim 1, wherein the electrically conductive lines are electrically connectable to the biometric sensor on the back side of the biometric sensor.

11. The biometric sensor module according to claim 1, wherein the electrically conductive lines are electrically connectable to the biometric sensor from a side facing towards the front side of the biometric sensor through bonding wires.

12. The biometric sensor module according to claim 1, wherein the top film is arranged to cover at least a portion of the front side of the biometric sensor.

13. The biometric sensor module according to claim 1, wherein the biometric sensor is sandwiched between the top film and the bottom flexible film.

14. The biometric sensor module according to claim 1, wherein the top film is arranged to cover at least a portion of the array of sensing elements on the front side of the biometric sensor.

15. The biometric sensor module according to claim 1, wherein the top film includes an opening where the biometric sensor is located, wherein side walls of the opening in the top film is attached to side walls of the biometric sensor.

16. The biometric sensor module according to claim 1, wherein the at least one electrically conductive line is arranged in the bent portion of the bottom flexible film, wherein at least one of the electrically conductive lines is adapted to electrically connect the biometric sensor to the external electrical circuit via the bent portion.

17. A device including the biometric sensor module according to claim 1, the device comprising a bendable main body carrying the external electrical circuit, wherein the biometric sensor module is arranged in an opening of the device.

18. A method for assembling a biometric sensor module, comprising:
   providing a biometric sensor comprising an array of sensing elements for acquiring sensing signals indicative of a biometric feature of a user, the array of sensing elements arranged facing towards a front side of the biometric sensor;
   attaching the biometric sensor to a top film at the front side;
   attaching a bottom flexible film to a back side, opposite the front side, of the biometric sensor, the bottom flexible film carrying at least one electrically conductive line, wherein the biometric sensor is attached to a first side of the bottom flexible film, the bottom flexible film further carrying at least one electrically conductive pad on a second side opposite the first side, the at least one electrically conductive pad being electrically connected with the at least one electrically conductive line;
   forming an electrical connection between at least one electrically conductive line and the biometric sensor,
   bending the bottom flexible film towards the top film along sides of the biometric sensor, such that the bottom flexible film is attachable to the top film adjacent to bent portions of the bottom flexible film.

19. A method for assembling a biometric sensor module, comprising:
- providing a biometric sensor comprising an array of sensing elements for acquiring sensing signals indicative of a biometric feature of a user, the array of sensing elements arranged facing towards a front side of the biometric sensor;
- attaching a bottom flexible film to a back side, opposite the front side, of the biometric sensor, the bottom flexible film carrying at least one electrically conductive line, wherein the biometric sensor is attached to a first side of the bottom flexible film, the bottom flexible film further carrying at least one electrically conductive pad on a second side opposite the first side, the at least one electrically conductive pad being electrically connected with the at least one electrically conductive line;
- forming an electrical connection between at least one electrically conductive line and the biometric sensor,
- attaching the biometric sensor to a top film closer to the front side of the biometric sensor than the bottom flexible film;
- bending the bottom flexible film towards the top film along sides of the biometric sensor, such that the bottom flexible film is attachable to the top film adjacent to bent portions of the bottom flexible film.

* * * * *